United States Patent [19]

Anderson et al.

[11] Patent Number: 4,828,210
[45] Date of Patent: May 9, 1989

[54] ONE-HAND ADJUSTABLE LOCK FOR TETHER

[75] Inventors: Robert K. Anderson, Roseville; Ruth E. Foster, Minneapolis; Bertyl W. Carlson, Richfield, all of Minn.

[73] Assignee: Alpha-M, Inc., Minneapolis, Minn.

[21] Appl. No.: 181,199

[22] Filed: Apr. 13, 1988

[51] Int. Cl.[4] .............................................. A47B 96/09
[52] U.S. Cl. ................................ 248/229; 248/231.7; 248/316.3; 119/103; 24/136 R
[58] Field of Search ...................... 248/231.7, 229, 314, 248/316.5, 231.3, 72, 231.6, 316.3, 231.4; 24/136 R, 136 A, 71.1, 68 CD; 119/103

[56] References Cited

U.S. PATENT DOCUMENTS

| | | | |
|---|---|---|---|
| 1,369,747 | 2/1921 | Jordan | 248/231.7 X |
| 2,412,097 | 12/1946 | Russell | 24/136 A |
| 2,564,389 | 8/1951 | Boehm et al. | 248/314 X |
| 2,995,332 | 8/1961 | Davis | 248/229 |
| 3,262,666 | 7/1966 | Solum | 248/231.7 X |
| 4,702,448 | 10/1987 | Lo Jacono et al. | 248/231.7 |

FOREIGN PATENT DOCUMENTS 1880 of 1913 United Kingdom ............. 24/136 A

Primary Examiner—Alvin C. Chin-Shue
Attorney, Agent, or Firm—Kinney & Lange

[57] ABSTRACT

An adjustable lock for a tether line or the like, which permits one-hand operation and which is incorporated into a clamp to permit the lock to be clamped onto a support, for example, an upright column or railing on a animal grooming table, and which will permit a person to either lengthen or shorten the tether to a suitable length with one hand operation. The lock comprises a bore and an angled cross cam slot in the clamp housing. The bore carries the tether line, and the slot has a roller mounted therein. The slot has an end that intersects the bore and that will pinch or clamp the line in one direction of camming movement, and will release in the opposite direction to permit locking or release of the line by pulling the line in the appropriate direction through the bore.

3 Claims, 2 Drawing Sheets

ONE-HAND ADJUSTABLE LOCK FOR TETHER

BACKGROUND OF THE INVENTION

1. Field of the Invention

The present invention relates to a line locking device useful for adjustably holding tethers or lines, which can be clamped in a variety of locations for use.

2. Description of the Prior Art

Various line lock devices have been developed, including types of wedge locks for lines such as tethers. Grooming table tethering devices have been used as shown in U.S. Pat. No. 3,266,464, which discloses a line that can be used for holding an animal that is being groomed, and which uses a type of wedge lock for holding the tether at various lengths directly on a support arm on the grooming table This device requires two-handed operation in order to work satisfactorily, and this is a drawback for operation when at least one of a person's hands is occupied with restraining the animal while also attempting to adjust the tether length. The device shown in this patent is difficult for people that are handicapped to use.

A fish stringer holder is shown in U.S. Pat. No. 2,564,389, and this has a spring loaded roller that is adapted to hold a metal fish stringer pin on the end of a flexible stringer line. The roller is spring loaded toward a latching position. The fish stringer holder has a housing attached to a clamp member but the latching arrangement is not integrally formed as part of a C-clamp housing.

A rope and cord tightening device that utilizes a ramping or cam pin for holding a rope is also shown in U.S. Pat. No. 1,832,388, but again, not in an easily used clamp housing that permits one-handed operation for adjusting the length of a tether.

A line tensioner having a hook at one end is illustrated in U.S. Pat. No. 4,377,886. Various other lines holders and guides that utilize a cam or wedge lock type holder have been advanced, for example, as illustrated in U.S. Pat. Nos. 225,923; 500,491; and 3,572,804. Other tethering type devices for animal grooming arrangements are shown in U.S. Pat. Nos. 4,041,905; 4,186,690; and 3,330,258. These again show various types of locks of adjustably restraining a tether, but none which operate with the simplicity of the present invention.

A type of a clamp that fastens onto a rod or pipe is shown in U.S. Pat. No. 3,902,931 but it does not have any length adjustment devices for lines or cords.

SUMMARY OF THE INVENTION

The present invention relates to a clamp and line lock for permitting lengthening and shortening a line which is attached to the clamp. The line lock is a cam or wedge lock integrally formed with the clamp body so that the adjustable line can be clamped to a suitable support and used for a variety of purposes, for example, in connection with the grooming of animals such as dogs, or for adjusting lines for tent poles and for a wide variety of uses around boats and the like.

The clamp is formed similarly to a C-clamp and has a jaw at one end, and a threadable screw having a clamp plate at the other end. One side of the clamp is open so that the clamp can be placed over a member and then the screw can be tightened down onto such member by threading the screw and forcing the member against the jaw.

The body of the clamp near the jaw has a first bore having an axis parallel to the plane of the clamp and which bore receives a line or cord that forms the tether. One end of this line may be (as shown) permanently attached to the clamp body. The free end of the cord then passes through the bore, and thus forms a loop. A second through slot is formed through the body and has a longitudinal axis at an angle to the bore and positioned so that one end of the slot (the locking end) intersects the bore. This forms a cam track, so that a roller in the slot can be moved toward the end of the slot that intersects the bore and as it does the roller will wedge against the line and force the line against the surfaces defining the bore to securely lock the cord in place as the line is pulled in direction tending to seat the roller. The roller releases by pulling on the free end of the line to move the roller along the slot in a direction away from the locking end of the slot, to release the line.

The roller will move away from the line and the line can then be adjusted freely, until such time as the roller is moved toward the locking end of the slot and the tether loop is lengthened or moved in a direction which tends to cam the roller against the tether.

If the clamp is mounted with the slot oriented so that gravity tends to move the cam roller toward the locking end of the slot, the line will easily lock each time the tether or line is lengthened, unless the roller is held away from the locking end of the slot.

In normal applications, the cam roller is mounted so its axis is substantially vertical and it will remain in a neutral position until moved slightly up the slot and then the tether is moved in a direction to tend to tighten the cam roller.

DETAILED DESCRIPTION OF THE PREFERRED EMBODIMENTS

Figure 1:
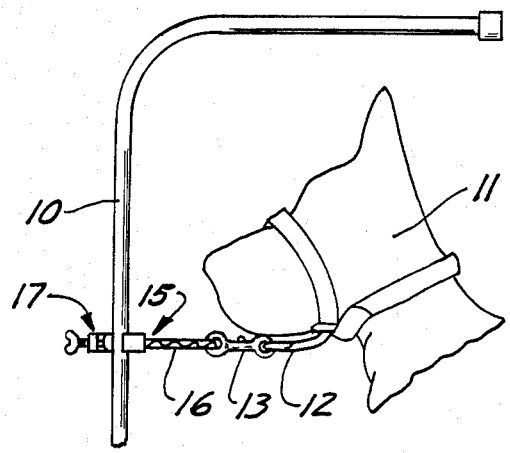
FIG. 1 is a side elevational view of a typical restraining or tethering pole used with a grooming table for animals, and showing the device of the present invention installed thereon.

FIG. 1 schematically shows arm 10 used for restraining an animal such as a dog 11, during grooming. The dog 11 has a humane training aid combination collar and muzzle on, which is sold under the trademark GENTLE LEADER. The muzzle loop has a ring 12 at the bottom of the jaw of the dog that is connected with a snap 13 of conventional design held by a tether lock and clamp combination indicated generally at 15 made according to the present invention. The combination tether lock and clamp includes a tether line 16 which is a line of suitable size, and which is attached at one end to a clamp assembly 17. The line can be nylon braided line, or other types of light rope or line.

The clamp assembly 17 is generally formed as a C-clamp, that has a main housing 20. The housing 20 has a jaw end 21, a base end 22, and an open side 23 which permits the clamp assembly 17 to be placed over a support, such as the upright pole shown at 25 forming part of arm 10. The threaded lock screw 26 is threaded through the base member 22 and has an end flange or lug 28 that will be used to clamp the jaw 21 against the pole 25. A wing nut 30 can be used for tightening the clamp or screw, or a suitable slide cross pin can be mounted in a cross hole in the outer end of the screw in a conventional manner for C-clamps.

The inner surface of the jaw 21, that is, the surface facing the base 22, has a series of shoulders or steps indicated generally at 32 and 33, that permit the jaw to ftt over different sized tubes or pipes and provide good clamping surfaces on different size and different cross-sectional shaped support bars, railing, pipes, table edges or the edges of boats or vehicles.

The jaw end 21 has a first bore 33A formed therein which receives the end of the line 16, and suitable rivets or other fasteners 34 can be used for anchoring one end of the line 16 securely in the jaw.

A line locking cam assembly is indicated generally at 35 and is formed at one corner of the housing or frame 20 of the clamp. The cam locking assembly includes a first cylindrical bore indicated in dotted lines at 36. As shown, the axis of bore 36 is parallel to the bisecting plane of the frame 20 of but is at a desired angle with respect to the longitudinal axis 26A of the screw. The bore opens to, an end edge surface 37 at the head end of the jaw 21, and also opens to an edge surface 38 along the side of the housing 20 forming the C-clamp. The bore 36 thus is a through bore extending diagonally between two edge surfaces. The bore 36 is of suitable size to receive and slidably mount the free end portion 40 of the line 16, after the tether has been passed through a loop or swivel eye 42 on the snap 13.

Figure 2:
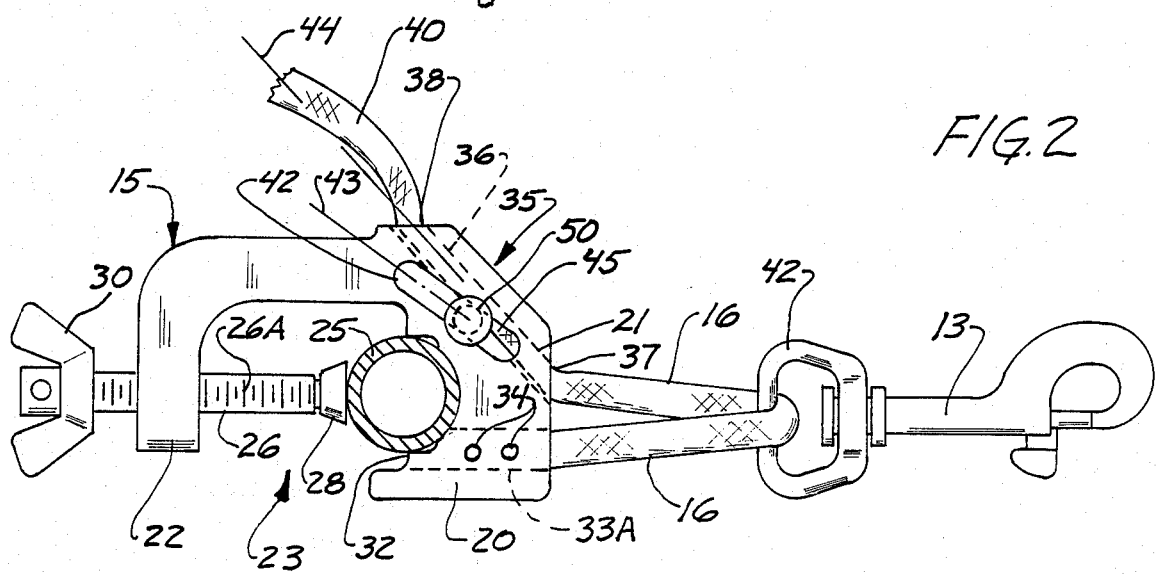
FIG. 2 is a top plan view of a clamp and adjustable line lock made according to the present invention.
Figure 3:
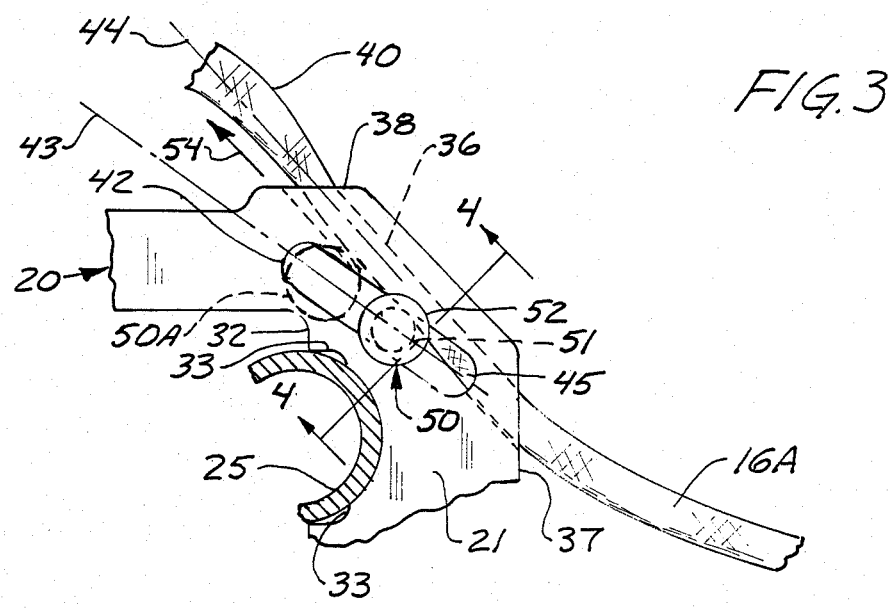
FIG. 3 is an enlarged plan view of the locking section of the clamp forming part of the present invention.
Figure 4:
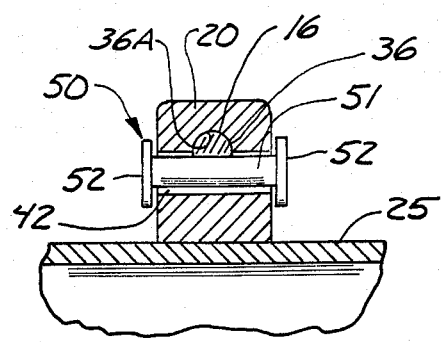
FIG. 4 is a sectional view taken as on line 4—4 in FIG. 3.

A cam slot indicated generally at 42 is formed in the housing and passes through the housing between side surfaces of the housing that are perpendicular to the edge surfaces through which bore 36 extends. The cam slot 42 has a central plane passing through the slot axis and indicated generally at 43 that is at an angle with respect to the central axis 44 of the bore 36. The slot 42 has a cam locking end portion 45 that intersects the bore 36, so that, as shown in FIGS. 2 and 3, a portion of the line 16 that passes through the bore 36 also protrudes or extends into the locking end 45 of the slot 42. The slot 42 has a cam locking roller 50 slidably and rotatably mounted therein. As can be seen in FIG. 4, the cam roller 50 has a cylindrical center portion 51 that spans the frame from side to side and end flanges 52 on the outer end that are like washers to the outside of the clamp housing side surfaces and which keep the pin from sliding out of the housing.

When the cam roller is in a position as shown in dotted lines at 50A in FIG. 3, for example, it is in a position where the surfaces of the cam slot 42 are not intersecting the bore 36. This means that the line 16 and in particular the free end 40, can be pulled in directions indicated by the arrow 54 (FIG. 3) freely. As long as the cam roller 50 stays in the position shown in dotted lines at 50A, the line 16 also can be pulled out in the opposite direction freely to permit lengthening the effective length of the tether supporting the snap relative to the clamp housing.

The cam roller 50, however, can be moved toward the locking end 45 of the slot 42 and the cylindrical portion 51 will then roll against the line in the region where the slot 42 and the bore 36 intersect, causing the roller to cam the line against the surfaces of the bore 36 opposite from the roller, as shown generally at 36A in FIG. 4, and lock the line 16 in place in the clamp. The more pulling force that is exerted on the line from snap 13, the tighter the cam roller 50 will lock as it will be clamped or urged toward the locking end 45 of the slot 42, to ensure tight and secure holding. The friction in the roller from the line will tend to move the roller in the respective direction of movement of the line.

The cam line locking and unlocking is a one-hand operation because the clamp holding the cam lock for the line securely holds the unit in place, and merely pulling on the free end 40 of the line with one hand will permit the roller 50 to move away from the locking end 45 of the slot and move back to its retracted position to permit the cam roller to release the line. Then, if the tether is to be lengthened, the line section in the bore can be pulled out slowly to the desired length. If the line is to be shortened, of course, continued pull on the free end 40 in directions indicated by the arrow in FIG. 3 will cause shortening. The roller can be manually moved against the line and the line length leading to the snap 13 can be pulled to tightly lock the tether in position.

In this way, easy one-hand operation is achieved with reliable locking, particularly when the roller axis is vertical as shown.

Figure 5:
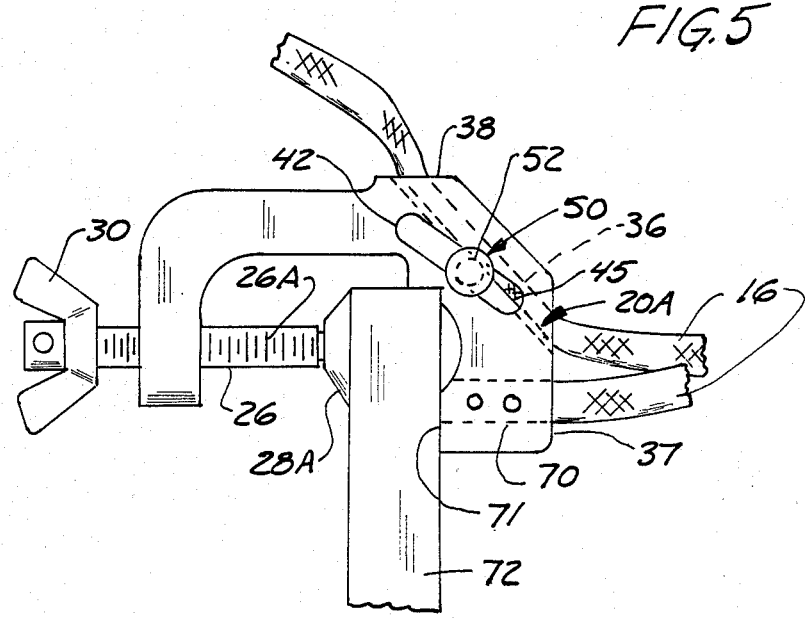
FIG. 5 is a side view of a modified form of the invention showing the clamp jaw modified to permit clamping onto the edge of a table or other panel.

In FIG. 5, a modified form of the invention is shown, and the C-clamp and outer frame, cam lock and anchor for the line are all the same as that previously shown. However, the jaw end indicated at 70 ends along a clamping surface 71, and this permits the clamp to be mounted onto a flat surface such as a table edge or a board indicated generally at 72. If desired, a larger flange end 28A can be utilized for more stability with this type of device.

The line locking operation will be exactly the same except that the clamp assembly as shown generally at 20A in FIG. 5 can be more easily clamped onto flat surfaces. The clamp can be clamped to many different poles, boat edges or anything to which a line will be secured.

Various configurations, of course, can be used for the clamp assembly, but the two intersecting bores (one of which is a slot for cam operation) make the clamp easy to manufacture and reliable in locking. The angle between the axis 44 of the bore 36 and the longitudinal axis or rolling axis 43 of the slot 42 can be selected to ensure that the locking action is secure and yet that cam roller can be unlocked by pulling on the free end 40 of the line.

The clamp can be used with a single length of line, not fastened as a loop. For example, the end of line 16 extending from surface 37 and shown at 16A in FIG. 3 could be left free or could be separately looped over a tent stake or fastened directly to swivel 42 of a snap or fastener. The locking action would be the same as explained previously.

The clamp assembly can be used for a line to a tent pole (or to a stake) and the line loop used as an easily adjusted tent line for staking a tent or for other uses where quick and reliable adjustment is desired, such as a line for mooring a boat.

Although the present invention has been described with reference to preferred embodiments, workers skilled in the art will recognize that changes may be made in form and detail without departing from the spirit and scope of the invention.

What is claimed is:

1. A line lock comprising:
   a clamp housing having a jaw portion and a threadable locking member cooperating with the jaw for clamping the housing onto a support, the clamp housing having a first edge surface at the jaw end and a second edge surface adjacent the first edge surface and being generally perpendicular to the first edge surface;
   a first bore through said housing, said first bore having a longitudinal length and a width of size to receive and slidably hold a line that is flexible, said first bore opening through both the first and second edge surfaces and being inclined with respect the direction of threading of the threadable locking member;
   a slot defined in said housing and being elongated in a longitudinal direction, said slot extending across the width of the first bore between first and second side surface of the housing, said slot having a locking end portion intersecting the first bore, and a second portion of the slot clearing the first bore;
   a roller member mounted in said slot and slidable along the longitudinal length of said slot so that the roller member reduces the effective size of the first bore when the roller member is in the locking end portion of the slot to clamp a line in said first bore against surfaces defining the bore, said roller being movable to the second portion of said slot wherein the roller clears a line in the first mentioned bore; and
   a line fixed to said clamp housing at a first location spaced from said first bore, and passing through said first bore, said line being of such size that the roller will clamp the line against a surface defining the first bore when the roller is positioned adjacent the locking end portion of the slot.

2. The apparatus as specified in claim 1 wherein the slot is positioned at an angle with respect to the longitudinal axis of the first bore said angle being selected so that the roller member will tend to ramp and tighten the line as a line extending from the bore in a first direction is pulled in such first direction urging the roller member toward the locking end portion of said slot, and said angle being selected to permit release of the roller member when the line extending in a second direction from the first bore is pulled in the second direction to exert a force tending to release the line from its clamped position.

3. The apparatus as specified in claim 1 wherein said line forms a loop between the first location and the first bore and a fastener member mounted in said loop.

* * * * *

UNITED STATES PATENT AND TRADEMARK OFFICE
CERTIFICATE OF CORRECTION

PATENT NO. : 4,828,210

DATED : May 9, 1989

INVENTOR(S) : Robert K. Anderson et al.

It is certified that error appears in the above-identified patent and that said Letters Patent is hereby corrected as shown below:

Title page:

In the References Cited Section, under U.S. Patent Documents, add the following:

| | | | |
|---|---|---|---|
| 225,923 | 3/1880 | Fenton..................... | |
| 500,491 | 6/1893 | Griswold................... | |
| 1,832,388 | 11/1931 | Heisser.................... | |
| 2,564,389 | 8/1951 | Boehm et al................ | 43/55 |
| 3,266,464 | 8/1966 | Davis...................... | 119/103 |
| 3,330,258 | 7/1967 | Rosenberg.................. | 119/103 |
| 3,572,804 | 3/1971 | Nims, et al................ | 294/82 |
| 3,902,931 | 9/1975 | Danciger, et al............ | 248/230 |
| 4,041,905 | 8/1977 | Prager, et al.............. | 119/103 |
| 4,186,690 | 2/1980 | Seiler..................... | 119/110 |
| 4,377,886 | 3/1983 | Golden..................... | 24/71.1 |
| 4,667,772 | 5/1987 | Kammerer................... | 182/6 |

Signed and Sealed this

Thirty-first Day of October, 1989

Attest:

DONALD J. QUIGG

*Attesting Officer*　　　*Commissioner of Patents and Trademarks*